(12) United States Patent
Djordjevic et al.

(10) Patent No.: US 10,333,618 B2
(45) Date of Patent: Jun. 25, 2019

(54) OAM BASED PHYSICAL LAYER SECURITY USING HYBRID FREE-SPACE OPTICAL-TERAHERTZ TECHNOLOGY

(71) Applicant: NEC Laboratories America, Inc., Princeton, NJ (US)

(72) Inventors: Ivan Djordjevic, Tuscon, AZ (US); Shaoliang Zhang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/964,815

(22) Filed: Apr. 27, 2018

(65) Prior Publication Data

US 2019/0007137 A1    Jan. 3, 2019

Related U.S. Application Data

(60) Provisional application No. 62/504,838, filed on May 11, 2017, provisional application No. 62/490,820, filed on Apr. 27, 2017.

(51) Int. Cl.
| | |
|---|---|
| *H04B 10/112* | (2013.01) |
| *H03M 13/11* | (2006.01) |
| *H04L 1/00* | (2006.01) |
| *H04L 27/36* | (2006.01) |
| *H03M 13/25* | (2006.01) |
| *G02B 6/028* | (2006.01) |
| *H04B 10/11* | (2013.01) |
| *H04B 10/516* | (2013.01) |
| *H04L 29/06* | (2006.01) |
| *H03M 13/37* | (2006.01) |
| *H04B 10/2581* | (2013.01) |
| *H04J 14/04* | (2006.01) |

(52) U.S. Cl.
CPC ....... *H04B 10/1125* (2013.01); *G02B 6/0288* (2013.01); *H03M 13/1102* (2013.01); *H03M 13/1171* (2013.01); *H03M 13/255* (2013.01); *H03M 13/3761* (2013.01); *H04B 10/11* (2013.01); *H04B 10/5161* (2013.01); *H04L 1/0057* (2013.01); *H04L 27/36* (2013.01); *H04L 63/08* (2013.01); *H04B 10/2581* (2013.01); *H04J 14/04* (2013.01)

(58) Field of Classification Search
CPC combination set(s) only.
See application file for complete search history.

(56) References Cited

U.S. PATENT DOCUMENTS

| | | | |
|---|---|---|---|
| 8,880,973 B1* | 11/2014 | Li | H03M 13/255 714/752 |
| 2002/0089726 A1* | 7/2002 | He | H04B 10/1121 398/121 |
| 2011/0182345 A1* | 7/2011 | Lei | H03M 13/11 375/227 |
| 2014/0068393 A1* | 3/2014 | Varnica | H03M 13/1108 714/786 |

(Continued)

*Primary Examiner* — David C Payne
*Assistant Examiner* — Omar S Ismail
(74) *Attorney, Agent, or Firm* — Joseph Kolodka

(57) ABSTRACT

Aspects of the present disclosure describe systems, methods, and structures for physical layer security using hybrid free-space optical and terahertz transmission technologies that advantageously overcome atmospheric characteristics that infirmed the prior art.

1 Claim, 7 Drawing Sheets

(56) References Cited

U.S. PATENT DOCUMENTS

| | | | |
|---|---|---|---|
| 2016/0041523 A1* | 2/2016 | Ashrafi | G03H 1/2645 |
| | | | 359/9 |
| 2017/0026095 A1* | 1/2017 | Ashrafi | H04B 7/0456 |
| 2017/0187442 A1* | 6/2017 | Luddy | H04J 11/00 |
| 2018/0034556 A1* | 2/2018 | Winner | H04B 10/1121 |

* cited by examiner

OAM BASED PHYSICAL LAYER SECURITY USING HYBRID FREE-SPACE OPTICAL-TERAHERTZ TECHNOLOGY

CROSS REFERENCE TO RELATED APPLICATIONS

This application claims the benefit of U.S. Provisional Patent Application Ser. No. 62/490,820 filed 27 Apr. 2017 and U.S. Provisional Patent Application Ser. No. 62/504,838 filed 11 May 2017, both of which is incorporated by reference as if set forth at length herein.

TECHNICAL FIELD

This disclosure relates generally to networking including optical networking. More particularly, it pertains to an OAM based physical layer security using hybrid free-space optical-terahertz technologies.

BACKGROUND

The networked and mobile computing environment that defines much of contemporary society has provided innumerable convenience and productivity benefits. Given such benefits—society have become increasingly dependent upon services delivered thereon. Perhaps unknown to many, underlying these services are vast optical networks transporting incalculable volumes of data.

Given the utility and importance of optical communications and networks, systems, methods, and structures that may enhance their security would represent a welcome addition to the art.

SUMMARY

An advance in the art is made according to aspects of the present disclosure directed to systems, methods, and structures that provide orbital angular momentum (OAM) based physical layer security using a hybrid free-space-optical-terahertz technologies.

Advantageously, systems, methods and structures according to aspects of the present disclosure employ the hybrid PLS scheme composed of FSO and THz subsystems, compensating for shortcoming of each other. The hybrid systems provides the robustness against atmospheric truculence effects. Particular advantages of systems, methods and structures according to the present disclosure is that the overall secrecy capacities are increased 2N times by employing our hybrid FSO-THZ PLS scheme that employs N OAM modes in the optical domain and N OAM modes in the THz-domain.

Viewed from an initial aspect, systems, methods and structures according to the present disclosure include A communications system employing a hybrid free-space optical (FSO) terahertz (THz) physical layer security scheme comprising: a transmitter including: a binary-to-nonbinary converter that converts an input binary sequence; a nonbinary LDPC encoder that encodes the nonbinary symbols and provides parity symbols to a mapper/modulator; a multidimensional mapper that maps the nonbinary symbols; and a free space optical and THz transmitter for transmitting the symbols via a FSO and THz channel(s) respectively; a receiver including: a FSO and a THz receiver for receiving transmissions on the FSO and THz channel(s) respectively; a nonbinary a posteriori probability (APP) demapper which receives any data from the FSO and THz receivers and the mapped/modulated parity symbols from the mapper/demodulator, said APP calculates symbol log-likelihood ratios (LLRs); and a nonbinary LDPC decoder that receives the LLRs and outputs any corrected symbols transmitted.

Additional aspects include employment of N orbital angular momentum (OAM) modes in an optical domain and N OAM modes in a THz domain. Further aspects include nonbinary LDPC codes chosen such that any information symbols remain intact while generalized parity-symbols are algebraically related to the information symbols. And still further aspects include information symbols are transmitted over the FSO and THz channels while the generalized parity symbols are transmitted over classical channel(s).

BRIEF DESCRIPTION OF THE DRAWING

A more complete understanding of the present disclosure may be realized by reference to the accompanying drawing in which:

FIG. 4(A) and FIG. 4(B) are plots illustrating average FSO secrecy capacity (normalized per single dimension in: FIG. 4(A) weak, and FIG. 4(B) strong, turbulence regimes according to aspects of the present disclosure.

Figure 1:
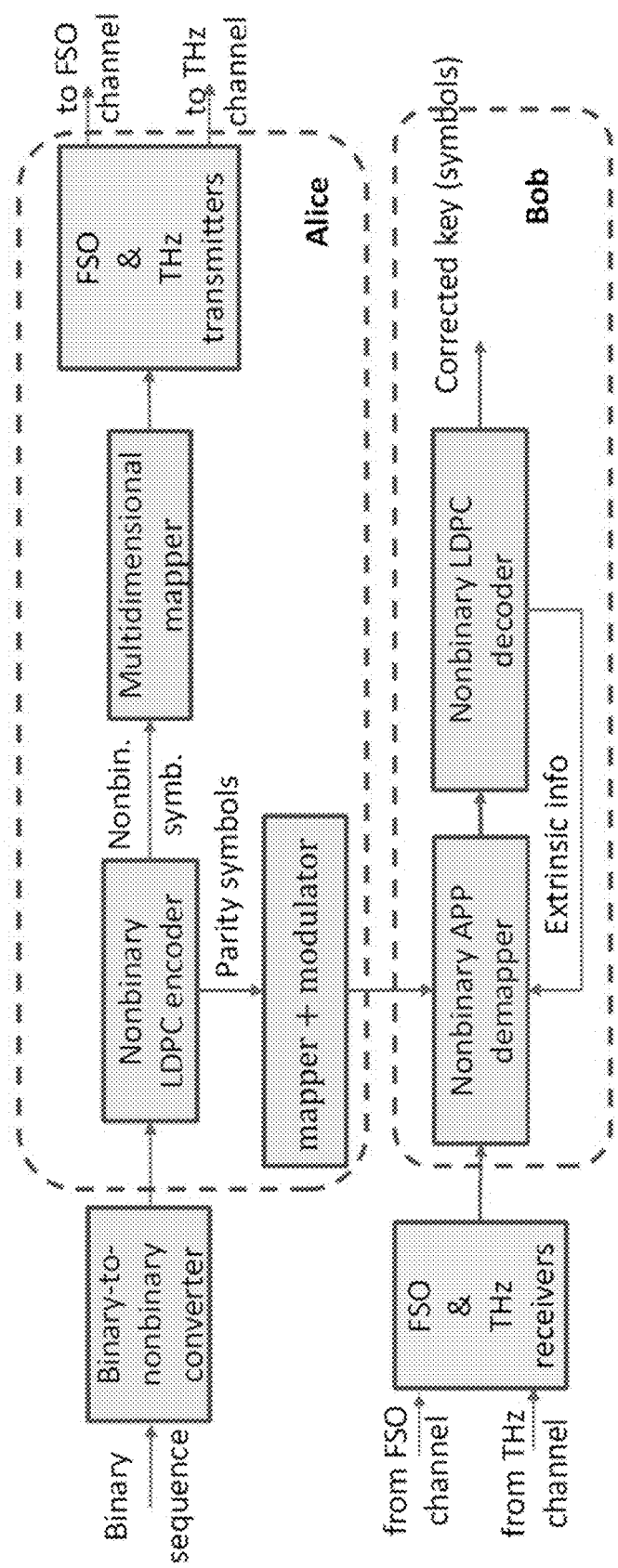
FIG. 1 is a schematic block diagram of an illustrative hybrid free space optical, terahertz (FSO-THz) physical layer security (PLS) scheme according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that the "information society" in which we live is significantly affected by Internetworking technologies (i.e., the Internet), and is characterized by a never-ending demand for higher information carrying capacity and distance-independent connectivity. Importantly, this exponential growth of Internet traffic does not appear to be diminishing any time soon. Given this growth, one would expect that the security of data transported via the Internet would be of utmost concern. And while there are many proposals on how to deal with bandwidth, the security of optical networks (ONs)—which generally serve as the "backbone" of the Internet—seems to be completely neglected. Significantly—and as will be readily appreciated by those skilled in the art—if one gains access to underlying optical signals transporting Internet traffic, an unlimited amount of data may be compromised. Accordingly, the security of optical networks is a concern that must be addressed.

Fortunately, in response to such concern with respect to the security of optical communications systems, quantum key distribution (QKD) and chaotic cryptography techniques have been recently proposed as viable security approaches. With respect to QKD, most research efforts have focused on two-dimensional QKD, such as the polarization state of photons. Unfortunately, data rates for systems employing quantum key exchange are very low, and their transmission distance is limited.

On the other hand, in chaos cryptography the dynamics of a laser employed is prescribed to follow a given trajectory depending on the information to be transmitted. To decode the prescribed trajectory, synchronism between a transmitter and a receiver is required.

To avoid high cost associated with QKD, properly designed fiber Bragg gratings (FBGs)—operating as optical encryption devices have been advocated. In fact, we have proposed employing a super-structured Bragg gratings (SS-BGs) approach to all-optical encryption. With such an approach, security is provided by a transformation of transmitted signals into noise-like patterns in the optical domain, thereby hiding any data signal structure to non-authorized users. Unfortunately, however, since impulse responses of encoders used are quasi-orthogonal—and even though the method is heuristic—these systems suffer from a limited cardinality of corresponding optical encryption signal set.

We note that cardinality has been significantly improved by using discrete prolate spheroidal sequences (also known Slepian sequences) based FBGs—designed using discrete layer peeling algorithm (DLPA)—that we have described elsewhere.

One interesting alternative to QKD worth mentioning is a so-called Y-00 protocol—which is based on mesoscopic coherent states, having an average number of photons per pulse ranging from 100 to 1000, which exceeds the QKD rates up to 1000 times. Unfortunately, as is known, the Y-00 protocol has the security equivalent to that of a classical non-random stream cipher.

At this point we note that orbital angular momentum (OAM) modes, related to azimuthal dependence of a wavefront, are mutually orthogonal so that this additional degree of freedom can advantageously be utilized to improve the physical-layer security (PLS) in both optical and wireless networks. Spatial light modulators (SLMs) are oftentimes used to generate OAM modes in optical domain—in particular in free-space optical (FSO) communications. On the other hand, it has been recently demonstrated that a traveling-wave circular loop antenna, with azimuthal phase distribution along the loop, can be used to generate OAM in the RF domain. Moreover antenna arrays, can be used to either generate/detect or multiplex/demultiplex OAM modes.

As is known, reliability of FSO links is affected by atmospheric turbulence effects, scattering effects, and low-visibility in foggy conditions. Conversely, RF technologies are not affected by these effects, but are nevertheless sensitive to rain and snow. In particular, THz technologies, have available bandwidths comparable to a typical wavelength channel in WDM systems. Based, on this complementarity, systems, methods, and structures according to the present disclosure advantageously employ hybrid FSO-THz technologies to significantly improve the PLS of either FSO or wireless communications We note that such hybrid FSO-THz communication present a new frontier in high-speed communications, with potentially broad applicability in both commercial and defense networks. As we shall show and describe, FSO-THz communications provides several orders of magnitude increase in achievable transmission rates over contemporary, state-of-the-art techniques and ensures both secure and uninterrupted operation irrespective of channel and weather conditions.

We note that we are particularly concerned with PLS of hybrid FSO-THz communication links and as such, we show and describe a hybrid PLS scheme including both FSO and THz subsystems that advantageously compensate for any shortcoming of each other. Systems, methods, and structures according to aspects of the present disclosure advantageously provides a robustness against atmospheric truculence effect. Finally, we note that systems, methods and structures according to aspects of the present disclosure provide overall secrecy capacities of corresponding 2-D may be increased by 2N times and by employing N OAM modes in the optical domain and N OAM modes in the THz-domain.

As will be readily appreciated by those skilled in the art, the exponential growth of data traffic on the Internet and other networks has placed enormous pressure on an underlying information infrastructure at every level—from core to access networks. In response to these ever-increasing data traffic demands, ITU-T, IEEE 802.3ba and OIF have completed the standardization work on 100 Gb/s Ethernet (100 GbE), while research focus has moved on to higher bit rates (400 Gb/s, 1 Tb/s, and beyond).

To address network capacity constraints, we recently described a transformational strategy with a technology employing significantly higher degrees of freedom per photon to enable the ultra-high capacity network connections (See, e.g., I. B. Djordjevic, "On advanced FEC and coded modulation for ultra-high-speed optical transmission," *IEEE Communications Surveys and Tutorials*, vol. 18, no. 3, pp. 1920-1951, Aug. 19, 2016; I. B. Djordjevic, A. H. Saleh, F. Kuppers, "Design of DPSS based fiber Bragg gratings and their application in all-optical encryption, OCDMA, optical steganography, and orthogonal-division multiplexing," *Optics Express*, vol. 22, no. 9, pp. 10882-10897, 5 May 2014.; and I. B. Djordjevic, A. Jovanovic, Z. H. Peric, T. Wang, "Multidimensional optical transport based on optimized vector-quantization-inspired signal constellation design," *IEEE Transactions on Communications*, vol. 62, no. 9, pp. 3262-3273, September 2014, the entire contents of which are incorporated by reference herein) including amplitude, phase, frequency, polarization, and orbital angular momentum (OAM). Moreover, through the concept of orthogonal division multiplexing (ODM) by employing the multidimensional signaling as we have described, it is possible to achieve beyond 1 Petabit/s (Pb/s) transmission per single wavelength channel based on conventional single-mode fibers (SMFs).

Thanks in part to its flexibility, security, immunity to interference, high-beam directivity, and energy-efficiency, free-space optical (FSO) technology represents an excellent candidate for high-performance secure communications. Despite these advantages, large-scale deployment of FSO systems has so far been so far affected by reliability and availability issues due to atmospheric turbulence in clear weather, low visibility in foggy conditions, Mie scattering effects, and high sensitivity to misalignment. Because of high directivity of optical beams, the FSO links are much more challenging to intercept compared to RF systems. Nevertheless, the eavesdropper can still apply the beam splitter on transmitter side, the blocking attack, or exploit beam divergence at the receiver side. And while research on FSO physical-layer security (PLS) is gaining momentum, the prior art on physical-layer security for FSO communications are largely based on direct detection and employ wiretap channel approaches.

Note that fog represents perhaps the most detrimental factor that impacts the reliability of an FSO link. In contrast, Terahertz (THz) signals are not impacted by these problems, but are affected by other weather conditions, such as rain and snow. Accordingly, these transmission media (FSO and THz) can be operated in a complementary fashion, depending on the predominant weather and atmospheric conditions.

In systems, methods, and structures according to aspects of this disclosure, we advantageously employ a hybrid FSO-THz technology based on OAM to dramatically improve the secrecy capacities of either RF or FSO links.

As is known, one can associate with a photon both spin angular momentum (SAM), related to polarization; and OAM, related to azimuthal dependence of a wavefront. Because these OAM eigenstates are orthogonal, the additional degree of freedom may advantageously be utilized for the physical-layer security in optical networks. On the hand—with respect to wireless communications—it has been shown that OAM can be generated in the RF domain as well, by employing circular array antennas, circular traveling-wave antennas, helical parabolic antennas, spiral phase plates, to mention few.

Accordingly, in systems, methods, and structures according to aspects of the present disclosure we advantageously employ OAM in both FSO and THz subsystems to significantly improve the secrecy capacity, while ensuring that FSO and THz subsystems compensate for shortcoming of each other. And while other spatial modes can also be used, however, the OAM modes require the lowest energies as the radial mode index is smallest. Of further advantage, THz technology is comparable to typical signal bandwidth per wavelength in WDM systems.

Hybrid FSO-THz PLS Scheme

OAM Modes in Optical- and RF-Domains

The angular momentum, J, of the classical electromagnetic field can be represented as:

$$J = \frac{1}{4\pi c}\int_V E \times A \, dV + \frac{1}{4\pi c}\int_V \sum_{k=x,y,z} E_k(r \times \nabla) A_k \, dV, \quad [1]$$

where E is the electric field intensity, A is the vector potential, and c is the speed of light; wherein the vector A is related to the magnetic field H and electrical field E intensities by H=∇×A and E=−c$^{-1}$∂A/∂t, respectively.

The second term in Eq. (1) is related to the OAM due to the presence of the angular momentum operator $\hat{L}=(r\times\nabla)$. Regarding the optical communications, among various optical beams that can carry OAM, the Laguerre-Gaussian (LG) vortex beams can advantageously be implemented through the use of spatial light modulators.

As is known and appreciated by those skilled in the art, that different LG modes corresponding to a fixed radial index are all mutually orthogonal. The orthogonality principle is also satisfied for pure OAM basis functions, defined as $\phi_n=\exp(jn\phi)$; n=0, ±1, ±2, . . . , because $$\langle\phi_m|\phi_n\rangle = \frac{1}{2\pi}\int_0^{2\pi} e^{-jm\phi}e^{jn\phi}d\phi = \begin{cases} 1, & n=m \\ 0,, & n\neq m \end{cases} = \delta_{nm} \quad [2]$$

Given that OAM-based basis functions are mutually orthogonal they can be used as the basis functions for either multidimensional signaling or to improve the PLS in optical networks.

Regarding the generation of OAM modes for wireless applications, it has been recently shown that circular traveling-wave antenna, spiral parabolic antenna, dual mode antennas, and circular antenna arrays, among, can be used to generate OAM modes in the RF domain.

For instance, the circular traveling-wave antenna of radius a, with azimuthal dependence of current distribution $\underline{I}=I_0 e^{jl\phi}$, will generate the electromagnetic (EM) waves with the vector potential expressed in spherical coordinates [r,θ,ϕ] as:

$$A(r) = \frac{\mu_0 I_0}{4\pi}\oint_L e^{jl\phi}\frac{e^{jk|r-r'|}}{|r-r'|}dl' \cong \quad [3]$$
$$\frac{(-j)^{-l}a}{r}\frac{\mu_0 I_0 e^{jkr}}{4}e^{jl\phi}J_{l-1}(ka\sin\theta)[\sin\theta\hat{r}+\cos\theta\hat{\theta}+j\hat{\phi}] +$$
$$\frac{(-j)^{-l}a}{r}\frac{\mu_0 I_0 e^{jkr}}{4}e^{jl\phi}J_{l+1}(ka\sin\theta)[\sin\theta\hat{r}+\cos\theta\hat{\theta}-j\hat{\phi}]$$

Clearly, the term $e^{jl\phi}$ corresponds to the azimuthal phase dependence of the l-th OAM mode of the vector potential. After substitution of Eq. (3) into (1), because of the rotational symmetry only the angular momentum in the direction of propagation will survive the integration over the whole EM beam (wave), which can be expressed in cylindrical coordinates [ρ,ϕ,z] as follows:

$$L_z = \varepsilon_0\int_0^{2\pi}d\phi\int\int \text{Re}\{jE^*(\hat{L}\cdot A)\}\rho \, d\rho \, dz. \quad [4]$$

By segmenting this circular antenna into N segments, with each segment carrying the same RF signal but with an incremental phase shift of 2πn/N, we can impose the n-th OAM mode on the RF carrier.

To detect a desired OAM mode in optical domain we need to use conjugate-complex computer generated hologram (CGH), recorded on SLM. On the other hand, to detect a desired OAM mode in the RF-domain, the corresponding segments in circular antenna need to be driven with incremental phase shifts of opposite sign compared to that used on transmitter side.

Description of Our Hybrid FSO-THz Technology-Based PLS Scheme

Our hybrid FSO-THz technology-based PLS scheme may be understood with reference to FIG. 1—which shows a schematic block diagram illustrative of our hybrid FSO-THz scheme according to aspects of the present disclosure.

The systematic nonbinary LDPC codes have been chosen because the information symbols stay intact while generalized parity-symbols are algebraically related to the information symbols. The information symbols are properly split and transmitted over the FSO and THz channels, as shown in FIG. 1, while the generalized parity symbols are transmitted over the authenticated classical channel. To improve the tolerance to atmospheric turbulence over FSO channel and multipath fading over THz channel, multidimensional signaling is used. Given that FSO and THz channels have complementary properties, as discussed previously, the probability of simultaneous FSO and THz channels' outage is very low.

We note that the suitable operating wavelength of FSO subsystem is 1550 nm, while the suitable THz regions include 150 GHz and 250 GHz. In particular, 120 GHz technology is becoming commercially viable, while the distances longer than 5 km with data rates of 20 Gb/s have been reported, and as such represents an excellent THz technique to be used in our hybrid FSO-THz PLS scheme according to aspects of the present disclosure.

To simplify the implementation, the initial multidimensional signal constellation is split into FSO and THz sub-constellations. On receiver side, after FSO and THz detection, the corresponding signals are converted into digital domain, and corresponding samples are passed to the nonbinary a posteriori probability (APP) demapper, where symbol log-likelihood ratios (LLRs) are calculated and passed to the corresponding LDPC decoder. The nonbinary LDPC coding is selected instead of binary coding to avoid the performance loss due to non-optimal mapping rules typically used in the literature. In particular, the nonbinary LDPC coding over GF(4) represents a good compromise between complexity and performance.

In the PLS scheme according to aspects of the present disclosure, the polarization state is not used for raw key transmission, but instead used to detect the presence of Eve. After information reconsolidation, the privacy amplification is then performed, to distill for the shorter key with negligible correlation with Eve. This key is then used for secure communication, based on one-time pad or any symmetric cipher. It is well-known that classical protocols rely on the computational difficulty of reversing the one-way functions, and in principle cannot provide any indication of Eve's presence. However, the FSO subsystem can be operated at a desired margin from the receiver sensitivity, and for known channel conditions the Eve's beam-splitting attack can be detected as it will cause sudden decrease in secrecy capacity $C_s$, defined as $$C_s = C_{AB} - C_{AE}, \quad [5]$$

where $C_{AB}$ is the instantaneous capacity of Alice-Bob channel and $C_{AE}$ is the instantaneous capacity of Alice-Eve channel.

From our recent studies of multidimensional signaling systems, we have learned that channel capacity can be increased linearly with number of degrees of freedom, rather than logarithmically with signal-to-noise ratio for conventional 2-D schemes. These observations support our decision to employ the OAM modes in both FSO and THz subsystems to dramatically improve secrecy capacity when compared to conventional 2-D schemes.

We note that the use of OAM modes to increase the secret key rates is always sensitive to the crosstalk among OAM modes and potential eavesdropper can compromise the security by relying on spatial coupling, without being detected by Alice and Bob. To solve for this problem, systems, methods, and structures according to the present disclosure rely on multidimensional signaling. In multidimensional signaling, the OAM modes are used as basis functions, and by detecting the signal in any particular OAM mode Eve will not be able to compromise security as only a single coordinate will be detected.

Figure 2:
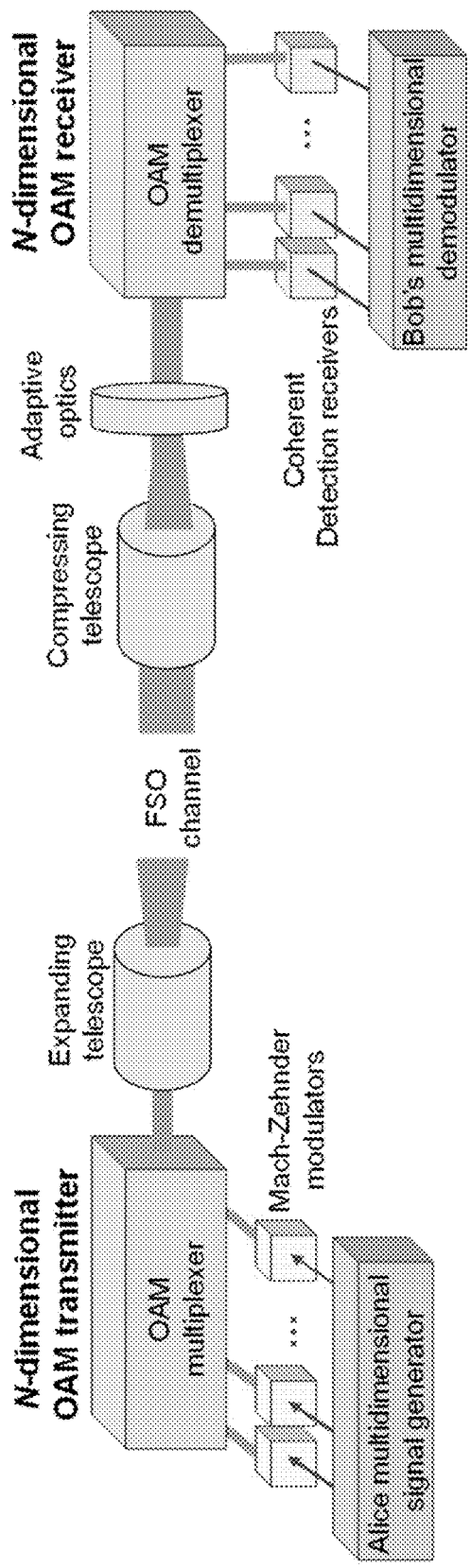
FIG. 2 is a schematic diagram of an illustrative orbital angular momentum (OAM) based system of an illustrative PLS scheme according to aspects of the present disclosure.
Figure 3:
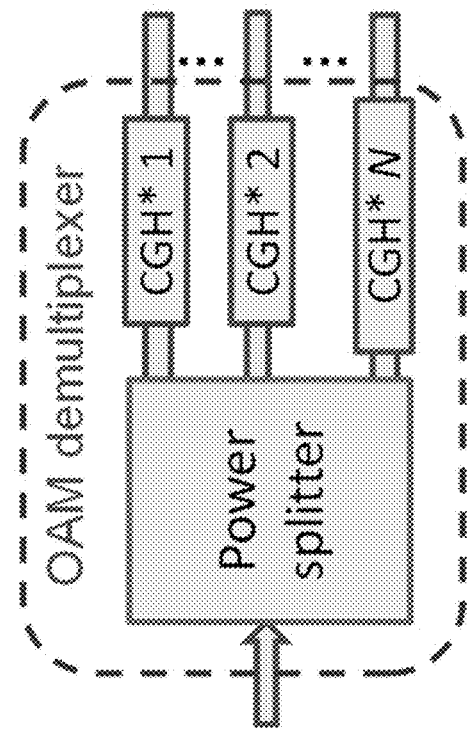
FIG. 3 is a schematic diagram of an illustrative configuration of OAM: (left) multiplexer and (right) demultiplexer for an illustrative FSO subsystem according to aspects of the present disclosure.
Figure 3:
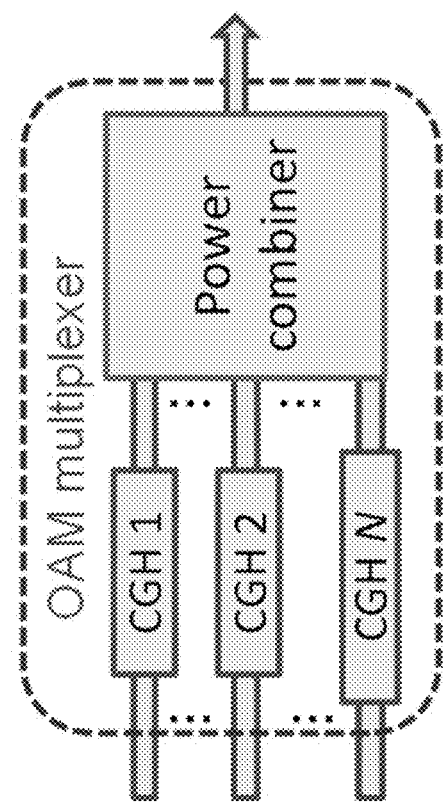

Before concluding this section, we provide additional details on FSO subsystem, which is shown schematically in FIG. 2. Alice multidimensional signal generators provide the coordinates of sub-constellation corresponding to the FSO subsystem. The single transmit laser is used, whose output is split into N laser signals through the effect of a 1:N power splitter (optical star), and corresponding coordinates are imposed on the laser beam signals by Mach-Zehnder modulators (MZMs). Corresponding signals at MZMs' outputs are combined together by an OAM multiplexer, shown in FIG. 3 (left), with corresponding OAM modes imposed with the help of CGHs. After optical amplification (by EDFA), the optical beam is transmitted by an expanded telescope towards the remote destination (Bob). The adaptive optics (AO) kit is used to reduce the distortions introduced by turbulence effects. The AO is optional, and it is not needed if FSO is used only in PLS. At Bob's side, the OAM demultiplexer, implemented as shown in FIG. 3 (right), provides the projections along OAM basis functions, followed by the coherent optical detection. The same local laser is used to detect all OAM modes, with the help of 1:N power splitter (optical star). After coherent topical detection, Bob's demodulator is able to determine the point transmitted in FSO sub-constellation.

Illustrative Secrete Capacity Results

Figure 4A:
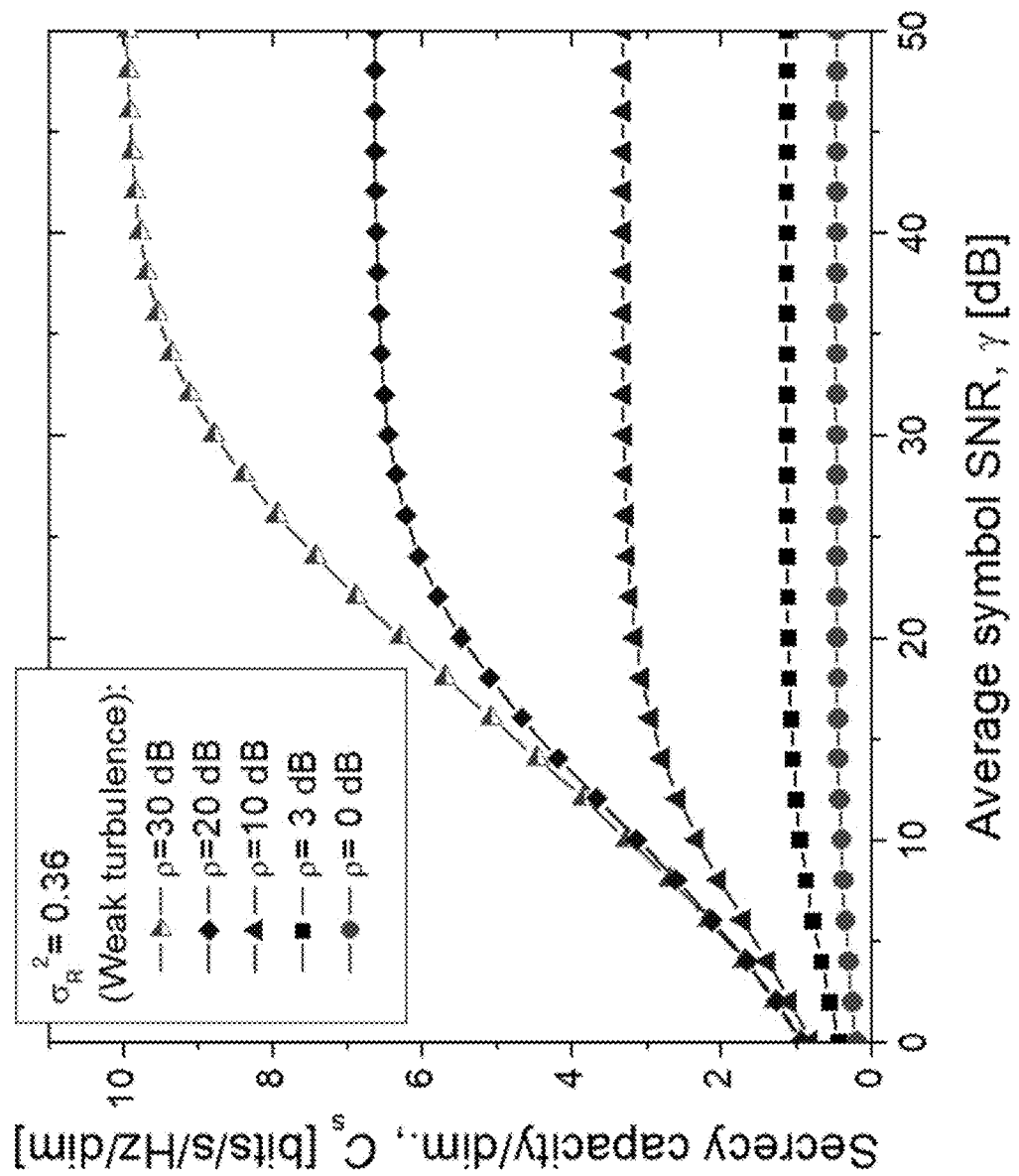
Figure 4B:
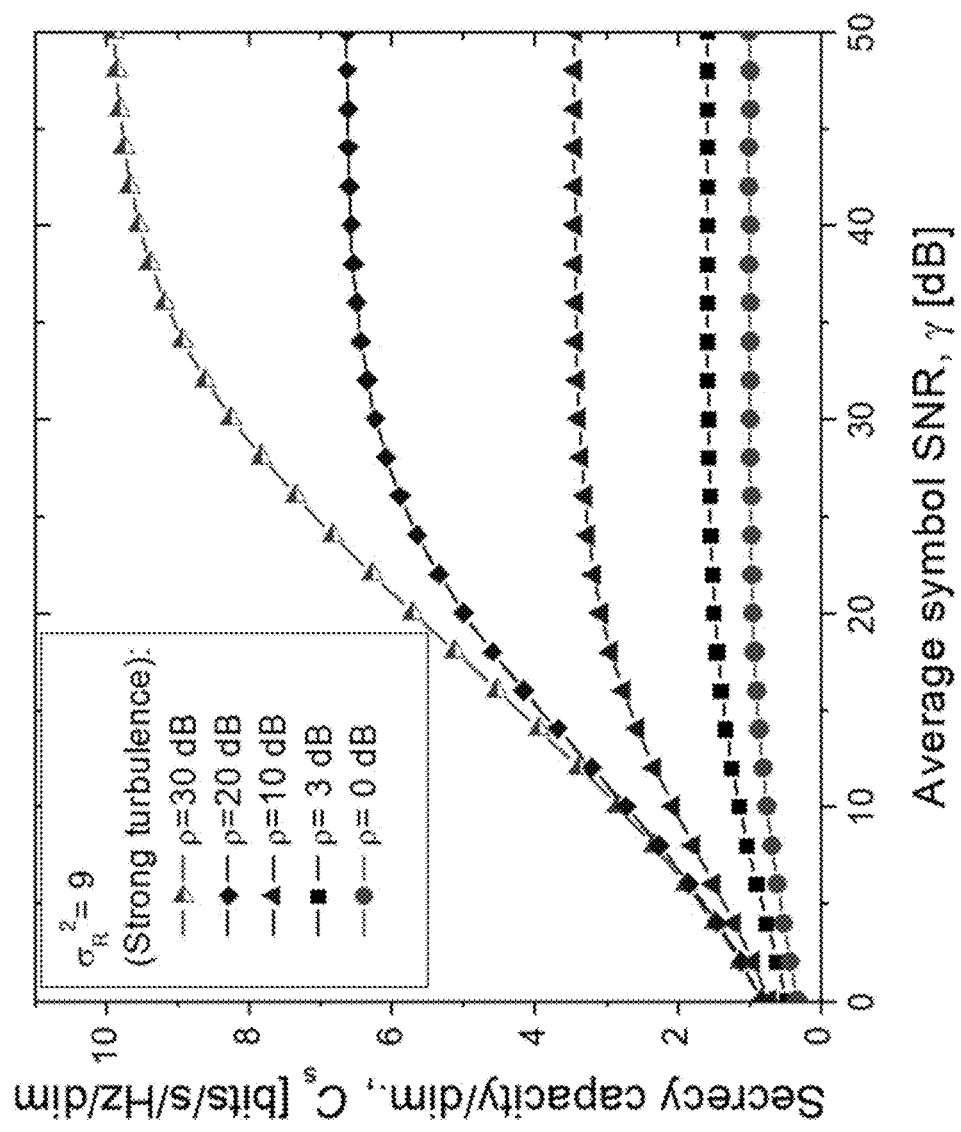

To demonstrate high potential of our hybrid FSO-PLS scheme, we perform the Monte Carlo simulations, with results of simulations summarized in FIG. 4(A), FIG. 4(B), and FIG. 5(A) and FIG. 5(B). In FIG. 4(A) and FIG. 4(B), the secrecy capacity, normalized per single dimension, when only FSO channel is used in PLS is provided. The FSO channel is modelled by using gamma-gamma distribution, and the Rytov variance is used to characterize the turbulence strength. It is defined as $\sigma_R^2 = 1.23 C_n^2 (2\pi/\lambda)^{7/6} L^{11/6}$ and it takes the propagation distance L, the operating wavelength $\lambda$, and the refractive structure parameter $C_n^2$ into account.

Weak turbulence is associated with $\sigma_R^2 < 1$, the moderate with $\sigma_R^2 \approx 1$, and the strong with $\sigma_R^2 > 1$. In each of the figures the ratio in average SNRs for Alice-Bob ($\bar{\gamma}_{AB}$) and Alice-Eve ($\bar{\gamma}_{AE}$) channels, defined as $\rho = \bar{\gamma}_{AB}/\bar{\gamma}_{AE}$, is used as a parameter. Clearly, when Eve is employing beam-splitting attack (with $\rho \approx 0$ dB) the turbulence strength helps improving the secrecy capacity. Moreover, with multidimensional signaling the secrecy capacity can be significantly improved compared to conventional 2-D schemes.

Figure 5A:
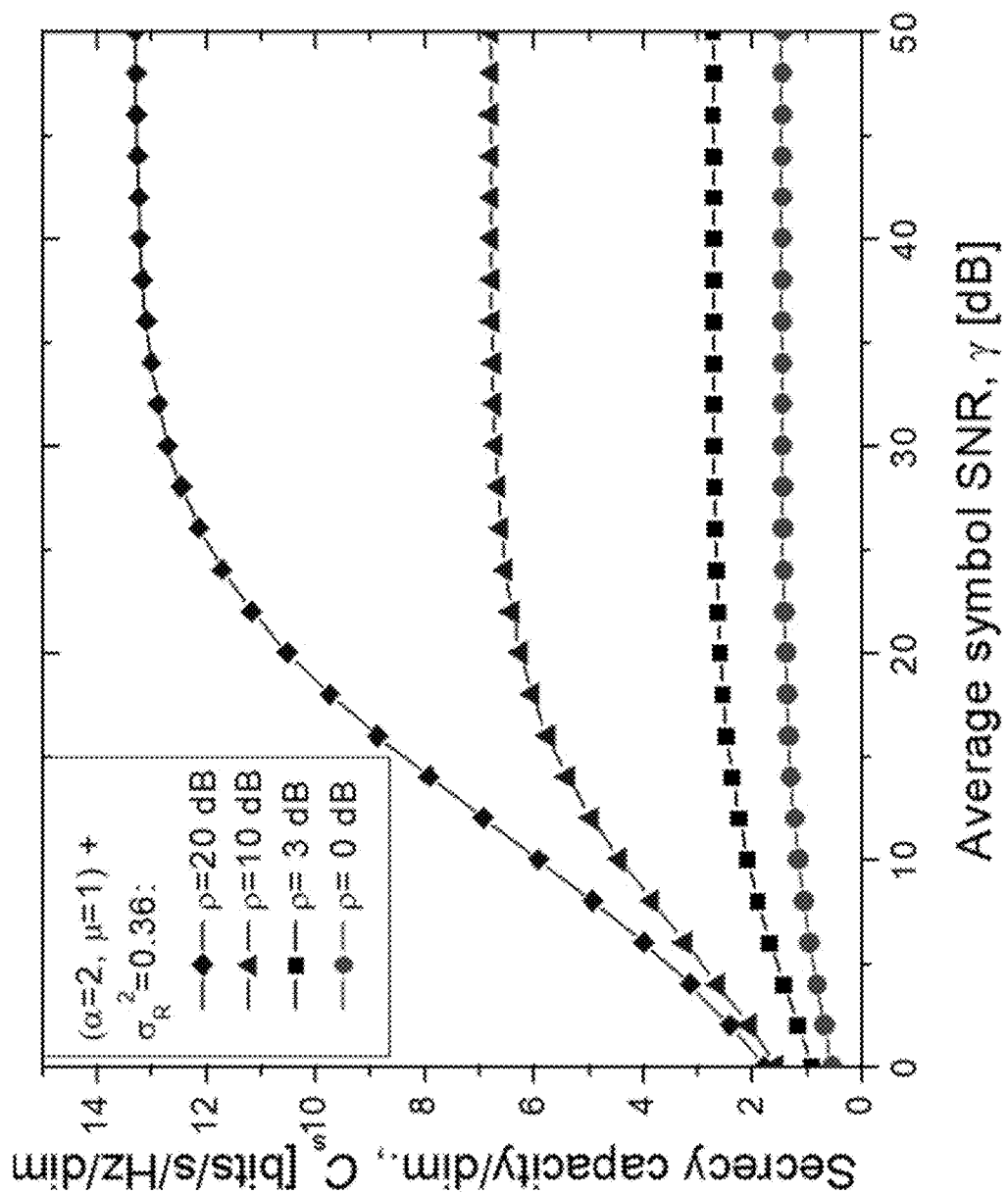
FIG. 5(A) and FIG. 5(B) are plots illustrating average FSO hybrid FSO-THz secrecy capacity according to aspects of the present disclosure.
Figure 5B:
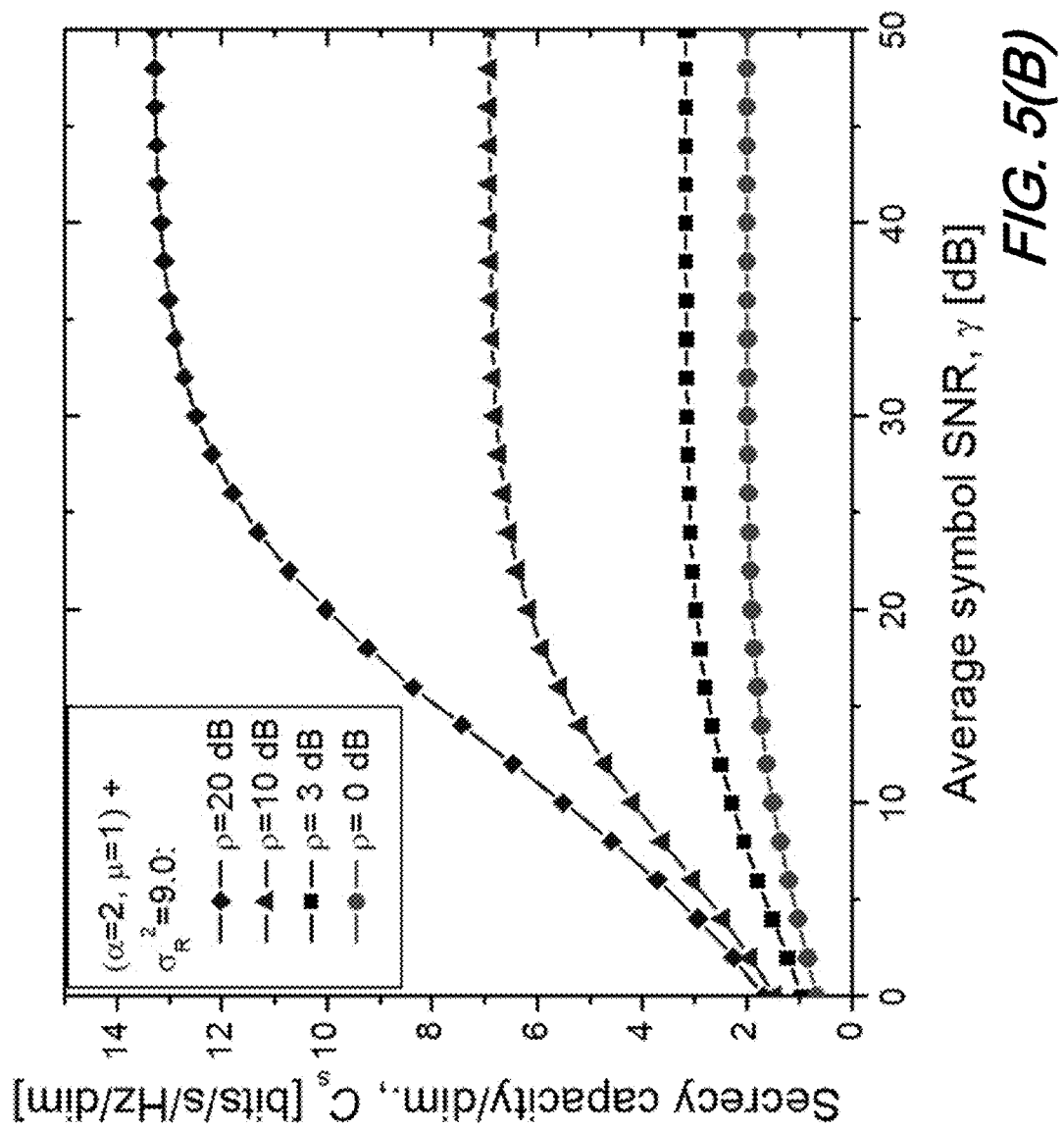

In FIG. 5(A) and FIG. 5(B), the secrecy capacities (normalized per single THZ and single FSO dimensions) are provided for hybrid FSO-THz PLS scheme. The turbulence strength in FSO subsystem is again characterized by the Rytov variance, while the multipath THz fading channel is modelled by employing ($\alpha,\mu$)-distribution, which is chosen because Rayleigh, Nakagami-m, exponential, Weibull and one-sided Gaussian distribution functions, to mention few, are all special cases of α-μ distribution. For instance, by setting α=2 and μ=1 we obtain the Rayleigh distribution, while by setting α=2 and μ=2 we obtain Nakagami m=2 distribution. Since the Rayleigh distribution represents the worst-case scenario for the THz-subsystem, it has been employed in simulations in FIG. 5(A) and FIG. 5(B). Clearly, when the hybrid FSO-THz PLS scheme is used, the secrecy capacity of FSO system can be doubled. Moreover, the hybrid system provides the robustness against atmospheric truculence effects, given that result in weak and strong turbulence regimes, are not much different. Finally, the overall secrecy capacities of corresponding 2-D can be increased 2N times be employing the proposed hybrid FSO-THZ PLS scheme, employing N OAM modes in optical domain and N OAM modes in THz-domain.

At this point, while we have presented this disclosure using some specific examples, those skilled in the art will recognize that our teachings are not so limited. Accordingly, this disclosure should be only limited by the scope of the claims attached hereto.

The invention claimed is:

1. A communications system employing a hybrid free-space optical (FSO) terahertz (THz) physical layer security scheme comprising:
    a transmitter including:
        a binary-to-nonbinary converter that converts an input binary sequence;
        a non-binary LDPC encoder that encodes the nonbinary symbols and provides parity symbols to a mapper/modulator;
        a multidimensional mapper that maps the nonbinary symbols; and
        a free space optical and THz transmitter for transmitting the symbols via a FSO and THz channel(s) respectively, said THz transmitter including a circular antenna segmented into N segments, with each segment carrying the same RF signal but with an incremental phase shift of $2\pi n/N$;
    a receiver including:
        a FSO and a THz receiver for receiving transmissions on the FSO and THz channel(s) respectively;
        a nonbinary a posteriori probability (APP) demapper which receives any data from the FSO and THz receivers and the mapped/modulated parity symbols from the mapper/demodulator, said APP calculates symbol log-likelihood ratios (LLRs); and
        a nonbinary LDPC decoder that receives the LLRs and outputs any corrected symbols transmitted
    wherein the system employs N orbital angular momentum (OAM) modes in an optical domain;
    wherein nonbinary LDPC codes are chosen such that any information symbols remain intact while generalized parity-symbols are algebraically related to the information symbols;
    wherein the information symbols are transmitted over the FSO and THz channels while the generalized parity symbols are transmitted over classical channel(s);
    wherein multidimensional signaling is used exclusively over the FSO channels and THz channels;
    wherein operating wavelength of the FSO is one selected from the group consisting of: 1550 nm, 2 μm, 3.85 μm, and visible; and
    wherein THz frequencies employed is one selected from the group consisting of 150 GHz and 250 GHz.

* * * * *